Sept. 20, 1960 E. M. MARK 2,952,870
CONTINUOUS CONDUIT-TYPE VULCANIZING APPARATUS
WITH NON-SURGING WATER-STEAM MEETING LEVEL
Filed Feb. 1, 1957 2 Sheets-Sheet 2
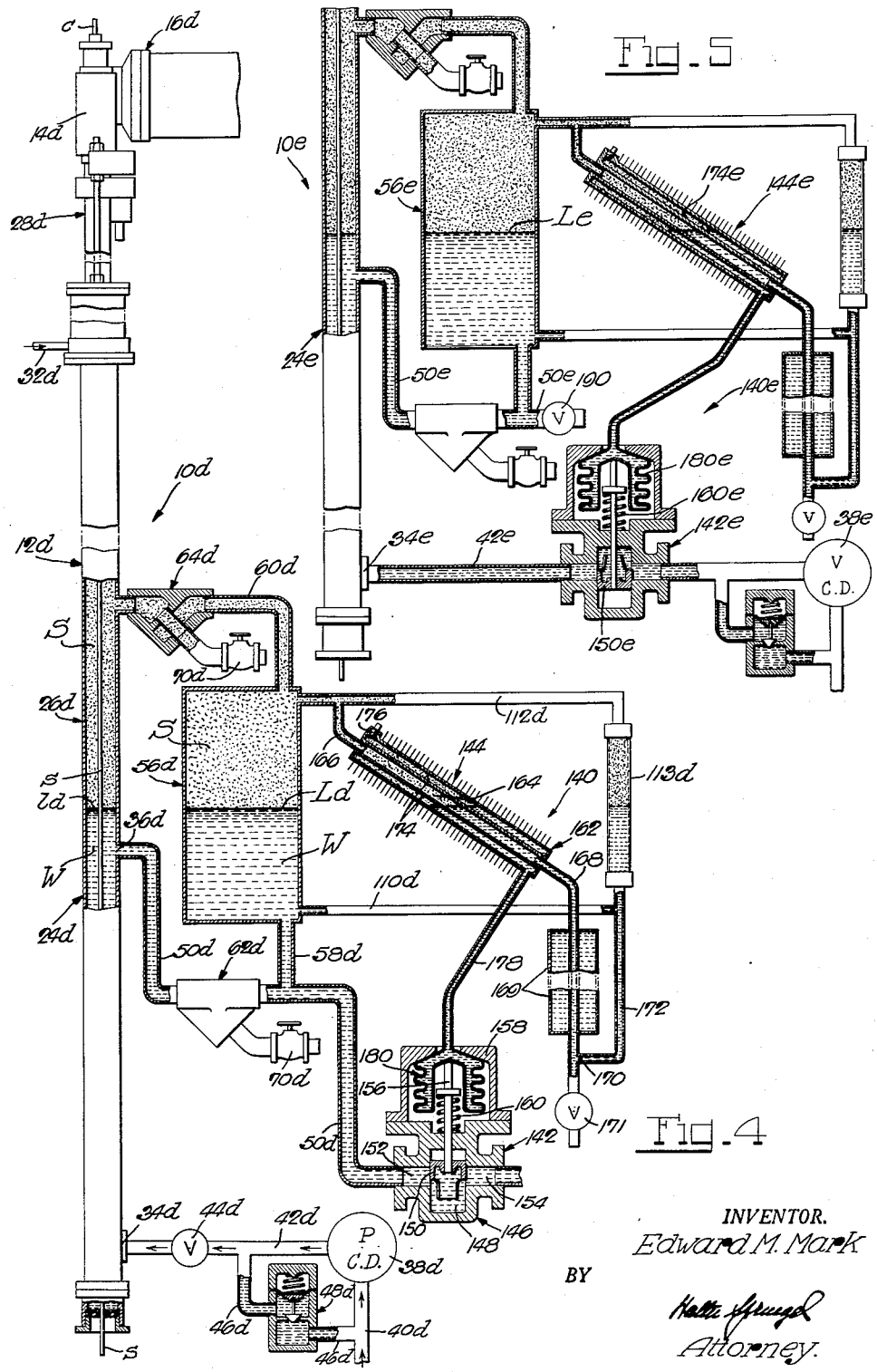
INVENTOR.
Edward M. Mark
BY
Attorney.

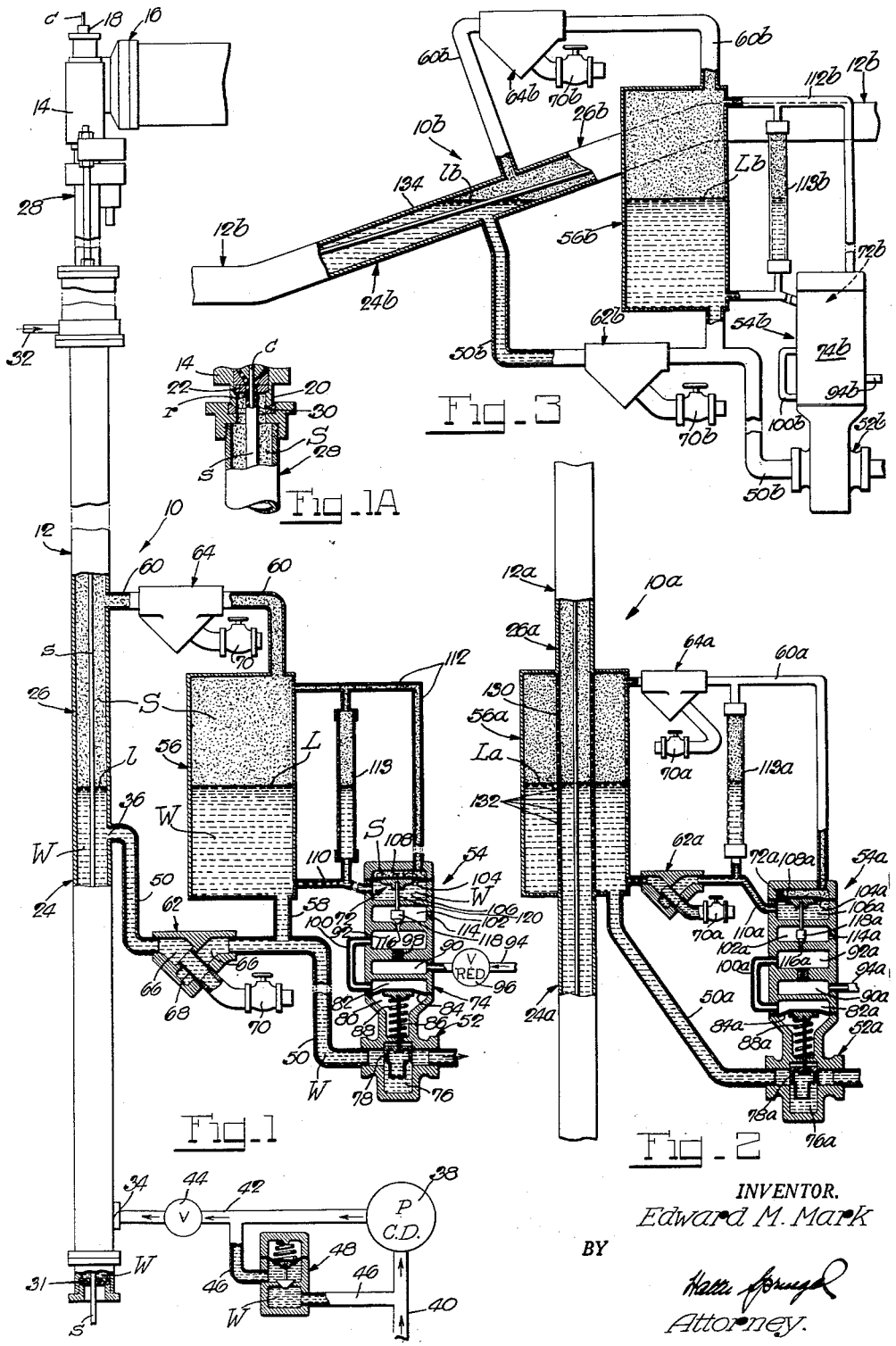

United States Patent Office 2,952,870
Patented Sept. 20, 1960

2,952,870

CONTINUOUS CONDUIT-TYPE VULCANIZING APPARATUS WITH NON-SURGING WATER-STEAM MEETING LEVEL

Edward M. Mark, Mystic, Conn., assignor to Standard Machinery Division of Franklin Research Corporation, Mystic, Conn., a corporation of Delaware Filed Feb. 1, 1957, Ser. No. 637,665

5 Claims. (Cl. 18—6)

This invention relates to the vulcanization of a rubber coating or jacket on a continuous core, and more particularly to apparatus for vulcanizing an extruded rubber jacket on a continuous core while in motion.

Apparatus to which the present invention relates is of the type having not only a high-pressure steam chamber or leg, but also a high-pressure cooling chamber or leg, for quite extensive, though not exclusive, use in the vulcanization of rubber-coated wire or cable. Thus, the wire or cable, after its passage through the customary side-delivery head of an extruder for the application of the rubber coating, passes through the steam chamber in which the rubber coating becomes vulcanized, whereupon the vulcanized product is passed into and through water under pressure in the cooling chamber without being first exposed to atmospheric pressure. The reason for cooling the vulcanized product before permitting it to emerge into the atmosphere beyond the cooling chamber lies in the well-known capacity of the customary jute and cotton wrappings on the wire strands to absorb moisture which in the course of the passage of the coated product through the steam chamber flashes into entrapped steam of considerable pressure which would unduly stress, and even burst, the vulcanized rubber coating, especially when of synthetic origin, if the product would pass from the steam chamber directly into atmospheric pressure. Thus, the pressure of the steam in the steam chamber is sufficiently high safely to contain the entrapped steam within the rubber coating of the product during the passage of the latter through this steam chamber, and the pressure of the water in the cooling chamber is also sufficiently high safely to contain the entrapped steam in the vulcanized coating of the product until it is condensed therein and no longer exerts pressure thereon by the time the product passes from the cooling chamber into the atmosphere.

Prior apparatus of this type comprises a steam chamber and a cooling or water chamber, both usually in the form of conduits which are arranged in tandem fashion. The steam conduit is connected with the extruder so that the rubber-coated product passes from the latter directly into the former wherein it is subjected to high-pressure steam which is continuously circulated therethrough. The length of the steam conduit is such that vulcanization of the rubber coating takes place while the product passes therethrough at the same rate at which it passes through the extruder head, and the vulcanization of this rubber coating is completed when the product passes into the other conduit through a seal which effectively separates the steam and water in the respective conduits. Water under pressure is continuously circulated through the cooling conduit in order to cool the vulcanized product before it leaves the latter through another seal and emerges into the atmosphere where it usually passes over a capstan and is wound onto a reel or reels.

While this prior apparatus performs generally satisfactorily, it does have certain disadvantages. Thus, the imperative provision of seals between the steam and water conduits and also at the outlet end of the water conduit, and the customary provision of exhaust hoods in the vicinity of these seals, not only makes for complexity of the apparatus and accordingly high cost of the same, but also renders general maintenance, repair, or replacement of parts, of the apparatus rather complicated and costly. Further, the usual seal of rubber or rubber-like material between the steam and water conduits, subjected as it is to the high temperature in the steam conduit on the one hand, and to the much lower temperature of the cooling water in the other conduit on the other hand, deteriorates rather rapidly and, hence, requires frequent replacement in order to avoid excessive and wasteful leakage of steam into the cooling water, especially since the steam pressure is customarily kept at a higher level than the water pressure. Also, in order to achieve in the first place satisfactory separation between the steam and water in the respective conduits, the seal therebetween must necessarily impinge on the rubber-coated product with considerable force, with the result that the vulcanized and as yet hot and dry coating of the product is subjected to more or less severe abrasion by this seal and may, in consequence, be marked so badly as to render the product inferior, or even unfit as a marketable item.

Other prior apparatus of this general type have also become known which lack a seal between the steam and water conduits and, instead, provide a single continuous conduit in which the circulating steam and the circulating cooling water therebelow meet at a level which is controlled by various expediencies. Of course, it is a prime consideration in all of these prior apparatus to keep the cross-sectional area of the aforementioned tandem-arranged conduits or continuous conduit as small as permissible throughout, not only to keep steam consumption and the volumetric flow rate of water through the cooling leg at a minimum, but also to induce lively replacement of the steam, as well as lively displacement of the water, in the respective legs in the immediate vicinity of the passing rubber-coated product throughout for optimum vulcanizing effect of the steam on the product and optimum heat-exchange between the latter and the water.

While the aforementioned other prior apparatus lack all the disadvantages of a seal between the steam and water, they leave nevertheless much to be desired in their performance, and especially in the control over the meeting level of the steam and water. Thus, it has been found that the water-flow controls of these other prior apparatus are unable to prevent undue and more or less continuous surging of the meeting level of the steam and water, with the result that, without continuous and close supervision, as well as correction, of their performance, the products processed in these apparatus are not uniformly vulcanized and frequently are either spoiled or must be re-vulcanized due to inadequate vulcanization in the first place.

It is the primary aim and object of the present invention to provide vulcanizing apparatus of the continuous conduit type which not only lacks a seal between the steam and water and, hence, has none of the aforementioned disadvantages caused thereby, but also has a control over the water flow through the cooling leg of the conduit which is so accurate that the volume of water therein at any instant varies so little from a preset volume that the inevitable surges of the meeting level of the steam and water, as caused by variations in the rate of steam condensation and other unavoidable factors, are so suppressed as to be to all practical intents and purposes nonexistent, with the result that a product processed in the apparatus is assuredly vulcanized fully and most uniformly without requiring either any supervision whatsoever, or correction at any time, of the water-flow control performance during an operating run of the apparatus of any duration.

It is another object of the present invention to provide vulcanizing apparatus of the continuous conduit type with the aforementioned water-flow control which is arranged to respond, not at all to variations of the surging meeting level of the steam and water in the conduit of customary small cross-sectional area throughout, but rather to variations of a reference meeting level of the same steam and water which, however, does not surge perceptibly and remains rather steadily at the mean meeting level of the aforementioned surging meeting level in the conduit, thereby to permit conventional water-flow controls of water-level responding type to perform accurately in accordance with actual needs, and not in uncontrollable hunting fashion.

It is a further object of the present invention to provide the aforementioned reference meeting level of steam and water for the water-flow control in vulcanization apparatus of the continuous conduit type, by providing the conduit of customary small cross-sectional area, within a zone thereof within which the meeting level of the steam and water therein would ordinarily surge, with a chamber, either in interposition directly in the conduit or in a bypass around this zone of the conduit, which intermediate its depth is on a level with the desired meeting level in the conduit, and which is of sufficient depth and width to hold at all times enough water and steam so that their meeting level will not change perceptibly under even the most aggravating conditions that tend to induce surging of the same, yet is of a volume which is insufficient appreciably to increase the steam consumption of the apparatus, or appreciably, if at all, to effect the desired lively replacement of the steam, and lively displacement of the water, in the immediate vicinity of the passing rubber-coated product throughout.

Another object of the present invention is to arrange the junction of the aforementioned chamber if directly interposed in the conduit, or the junction of the aforementioned bypass if the chamber is interposed therein, with the water leg of the conduit below, but in fairly close proximity to, the desired meeting level of the steam and water in the conduit, and arrange the water-flow control for circulation of water under pressure successively through the water leg and through the chamber, or vice versa, thereby to bring the circulating water into effective heat-exchange relation with the passing product at least throughout the by far greater part of the length of the water leg.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a view, partly in section and partly in diagrammatic form, of vulcanizing apparatus embodying the present invention;

Fig. 1A is an enlarged fragmentary section through a part of the same vulcanizing apparatus;

Fig. 2 is a fragmentary view, partly in section and partly in diagrammatic form, of vulcanizing apparatus embodying the present invention in a modified manner;

Fig. 3 is a fragmentary view, partly in section and partly in diagrammatic form, of vulcanizing apparatus embodying the present invention in another modified manner;

Fig. 4 is a view, partly in section and partly in diagrammatic form, of vulcanizing apparatus embodying the present invention in a further modified manner; and Fig. 5 is a fragmentary view, partly in section and partly in diagrammatic form, of vulcanizing apparatus embodying the present invention in still another modified manner.

Referring to the drawings, and more particularly to Fig. 1 thereof, the reference numeral 10 designates a vulcanizing installation or apparatus, comprising a conduit 12 which, in the present example, is shown disposed vertically, and is at its top end connected with the head 14 of an extruder 16. The present installation is adapted to vulcanize continuous stock s as it emerges at a constant rate from the head of the extruder. The stock s to be vulcanized is, in the present example, a rubber-coated core c of conductive wire or cable. To this end, the continuous core c is passed into the inlet end 18 of the extruder head 14, which is presently of the side-delivery type and carries near its outlet end 20 an extrusion die 22 (Fig. 1A) through which the core passes while receiving thereat an extruded coating r of insulation material, customarily uncured natural or synthetic rubber. This extruded coating r is vulcanized during the passage of the stock s through the conduit 12 from the top to the bottom thereof, and the vulcanized stock is after its passage from the conduit 12 usually passed over a power-driven capstan and thence wound on reels.

For the vulcanization of the extruded coating r on the stock s, the conduit 12 receives steam under pressure. In the present instance, cooling water is also circulated through a lower length of the conduit 12 for the aforementioned purpose of causing condensation of entrapped steam within the coating r before the stock s emerges into atmospheric pressure at the bottom end of the conduit 12, or for other purposes. To this end, the conduit 12, which may conveniently be formed by suitably joined conduit sections and be of substantially uniform and customarily relatively small width or cross-sectional area throughout, provides a water leg 24 and a steam leg 26 thereabove, with the meeting level of the steam and water therein desirably held constant at the junction of these legs. The conduit 12 is closed at its ends, except for passage therethrough of the stock s with a sealing fit. To this end, the top end of the conduit 12 is sealed by the extrusion die 22 in the outlet end 20 of the extruder head 14 (Fig. 1A), this by virtue of the operative extension of a splice box 28 with its end seal 30 in seating engagement with the outlet end of the extruder head 14. The splice box 28 may be of the self-sealing type shown in the patent to Fitler, No. 2,737,685, dated March 13, 1956, and, hence, requires no further description. The bottom end of the conduit 12 is closed by one or more suitably mounted, conventional sealing discs 31 (Fig. 1).

No effort is made here to define either exact dimensions of the conduit 12 or exact pressures of the steam and circulating cooling water in the conduit, for these may vary widely, depending on the production capacity of the extruder, the kind of rubber, whether natural or synthetic, employed for the coating r on the continuous core c and the duration of its exposure to the steam of a certain temperature and pressure for its complete vulcanization, the maximum permissible pull on the coated stock s for its passage through the extruder head 14 and conduit 12, the make-up of the continuous core c including the capacity of constituents thereof to absorb moisture, the time required for entrapped steam within the coating r to condense during the uninterrupted passage of the stock s through the water leg 24, and other factors. By way of example, the pressure of the steam in the steam leg 26 and the dimensions of the conduit 12 may for many purposes be the same as those of prior vulcanizing installations with or without a seal between the steam and water legs, while the pressure of the circulating water in the cooling or water leg 24 is somewhat higher than the steam pressure as is customary in vulcanizing installations of the continuous conduit type. Just to give one example, the pressure of the steam in the conduit 12 may be approximately 250 lbs. per square inch, while the pressure of the circulating water may and should be somewhat higher to assure continuous circulation.

Steam S under pressure from any suitable source is admitted into the steam leg 26 through an inlet 32, while the water or cooling leg 24 is provided, preferably near its ends, with inlet and outlet ports 34 and 36, respectively. In the present instance, a pump 38, preferably of constant-delivery type, has its input side in communication with a suitable water supply through a conduit 40, and has its output side in communication with the inlet port 34 in the cooling leg 24 through a conduit 42 in which is presently interposed a valve 44 which is settable for admitting water W at a desired volumetric flow rate into the cooling leg 24. Interposed in a bypass 46 around the pump 38 is a conventional relief valve 48 which permits return to the input side of the pump 38 of the excess water which is not permitted to pass into the cooling leg 24 due to the setting of the valve 44. The outlet port 36 in the cooling leg 24 is through a conduit 50 connected with a water-discharge valve 52 which forms part of a water-flow control system 54 to be described.

It is, of course, highly important for satisfactory and uniform vulcanization of the continuous coated stock s that the meeting level of the water W and steam S in the conduit 12 is kept substantially constant, rather than permitted to surge back and forth continuously and more or less violently. To this end, and in accordance with an important aspect of the present invention, the aforementioned water-flow control system 54 is arranged to respond in its regulation of the water-discharge valve 52 to variations of a reference meeting level of the water and steam in the installation which will not surge perceptibly under even the most aggravating conditions that tend to induce surging of the meeting level l of the water and steam in the conduit 12. This is achieved, in the present example, by arranging alongside the conduit 12 a closed chamber or tank 56 which intermediate, and preferably substantially midway of, its vertical extent is on a level with the desired water-steam meeting level l in the conduit 12, and connecting this tank with the water and steam legs 24 and 26 so that a reference meeting level L of the water and steam in the tank coincides with the desired water-steam meeting level l in the conduit 12. Thus, the bottom end of the tank 56 is connected with the outlet port 36 in the water leg, presently through the conduit 50 and a conduit 58 branching therefrom, while the top end of the tank 56 is connected with the steam leg 26 through a conduit 60. Since the tank 56 is connected with the aforementioned waterflow control system 54, and in order to safeguard the latter from the possibly clogging, and even damaging, effects of foreign solid or semisolid particles, such as rubber fragments, for instance, that become torn loose in the conduit 12, there are interposed in the conduits 50 and 60 strainers 62 and 64, respectively, in which these foreign particles become trapped. Thus, each of these strainers 62 and 64 has a through passage 66 and an interposed screen 68 in which these foreign particles become trapped and from which they may occasionally be expelled through a blow-out valve 70 in each instance.

As shown, the tank 56 is of greater width or cross-sectional area than the conduit 12, and is also of substantial depth. There is no need to define exact dimensions of this tank 56 in comparison to those of the conduit 12, the only consideration in selecting the dimensions of the tank 56 being that its width and depth are adequate to hold sufficient water underneath the reference level L therein and to have the latter of sufficient area so that this reference level L will not surge, or at the most surge only imperceptibly, under the usual, and even most aggravating, conditions that tend to induce the usual back and forth surging of the water-steam meeting level in the conduit 12 of customary relatively small width. In practice, the width and depth of the tank 56 are kept larger than absolutely required to hold the water-steam meeting level therein to all practical intents and purposes surgeless. Just to give one example, however, an actual installation which proved highly successful had a continuous conduit of approximately 33 feet in length and an inside diameter of approximately 4 inches throughout, while the tank used in this installation had a depth of 26 inches and an inside diameter of approximately 11 inches.

The water-flow control system 54, which includes the discharge valve 52, further includes, in the present instance, an instrumentality 72 which, on variation of the reference level L in the tank 56, acts to regulate the discharge valve 52. The discharge valve 52 comprises a casing 74 having a chamber 76 in which a valve element 78 is slidable into valve-opening and valve-closing positions, and two compartments 80 and 82 which are separated by a diaphragm 84 that is operatively connected with the stem 86 of the valve element 78. A spring 88 reacts with the diaphragm 84 in normally urging the valve element 78 into one of its aforementioned positions, in this instance into valve-opening position. The valve casing 74 is also provided, in the present instance, with two further compartments 90 and 92 of which compartment 90 is in communication with a suitable source of air under constant pressure through a conduit 94 in which is preferably interposed a pressure-reducing valve 96 that may be set to admit air under less pressure than its source into the compartment 90. The compressed air admitted into the compartment 90 passes through an orifice plug 98 into the compartment 92 and thence through a conduit 100 into the compartment 82 directly above the diaphragm 84 to react with the latter in urging the valve element 78 into its other, presently valve-closing, position. The instrumentality 72, which in this instance is shown also arranged in the casing 74, provides another compartment 102 and a chamber which by a diaphragm 104 is divided into two further compartments 106 and 108. The compartment 106 is through a conduit 110 in communication with the tank 56 safely below the reference level L therein, and preferably at, or in close proximity to, the bottom of the tank 56, while the other compartment 108 is through a conduit 112 in communication with the tank 56 safely above the reference level L therein. Preferably connected across the conduits 110 and 112 is a level gauge 113 which will visually indicate the reference level L in the tank 56. In thus providing for communication between the tank 56 and the compartments 106 and 108, the diaphragm 104 is at the top and bottom subjected to the pressures of the steam S and water W in the compartments 108 and 106, respectively. The compartment 102 is provided with an air outlet 114, and the compartment 92 directly therebelow has a vent opening 116 into the compartment 102. A valve element 118 is adapted to vary the effective cross-sectional area of the vent opening 116 on deflection of the diaphragm 104, and the latter is to this end operatively connected with the shank 120 of the valve element 118. Since the pressure of the water in the cooling leg 24 as well as in the tank 56 and, hence, also in the compartment 106, is slightly higher than the pressure of the steam in the steam leg 26 as well as in the tank 56 and, hence, also in the compartment 108, as mentioned hereinbefore, it stands to reason that the diaphragm 104 is, under the ensuing pressure differential to which it is subjected, flexed or deflected slightly upwardly in the first place, but not to the extent shown in Fig. 1, for the bottom side of the diaphragm 104 is additionally subjected to the static pressure of the head of water thereabove to the reference level L in the tank 56 and it is this static pressure which brings the upward deflection of this diaphragm to the exemplary extent shown in Fig. 1. However, since the pressure differential due to the slightly different pressures of the steam and water is kept substantially constant during performance of the installation, it stands to reason that variations of the static pressure of the head of water above the diaphragm 104, which occur when the reference level L in the tank 56 rises or drops, are relied upon to cause varying deflection of this diaphragm 104 for proper control of the effective area of the vent opening 116 by the valve element 118, to the end of admitting air under increased or decreased pressure into the compartment 82 in the discharge valve 52 when the reference level L in the tank 56 drops below and rises above the exemplary indicated level, respectively, and, in consequence, causing further partial closing and further partial opening, respectively, of the discharge valve 52. Since the static pressure of the head of water above the diaphragm 104 performs the important control function just described, the instrumentality 54, with its compartments 106, 108 and its diaphragm 104, is preferably disposed below the bottom end of the tank 56, so that this static pressure will be of sufficient magnitude to achieve deflection of the diaphragm 104 within the requisite control range. Of course, the proper operating pressure of the air on top of the spring-urged diaphragm 84 in the discharge valve 52 is a function of the force exerted by the spring 88 against this diaphragm 84 and the effective top area of the latter, and bears no relation to the pressures of the steam and water in the installation. Thus, the top area of the diaphragm 84 and the calibration of the spring 88 may be such that the proper or mean operating pressure of the air is considerably less than the set pressures of the steam and water in the installation. Thus, it may be mentioned, by way of example only, that in the aforementioned satisfactorily performing actual installation the reducing valve 96 was set for an output air pressure of 10 lbs. per square inch, the actual mean operating pressure of the air against the diaphragm 84 not having been determined.

The exemplary water-flow control system 54, which is shown more or less diagrammatically in Fig. 1 and comprises the described discharge valve 52 and instrumentality 72, is a standard product of the Leslie Company of Lyndhurst, New Jersey. This water-flow control system has proved to be so responsive in its action that the reference level L in the tank of the aforementioned dimensions fluctuated less than one inch during a normal day's run of the actual installation for at least 8 hours. This goes to show that this water-flow control system responds in its action to variation, at the very start, of the reference level L in the tank from its set level. It indicates also clearly that this highly responsive water-flow control system is applicable to vulcanizing apparatus of the continuous conduit type only because of the intervention of the tank 56 with its surgeless reference meeting level of the steam and water, and that it would utterly fail if exposed to the more or less ceaseless surges of the water-steam meeting level in the customarily narrow conduit 12 in the absence of the tank 56.

Reference is now had to Fig. 2 which shows a vulcanizing apparatus or installation 10a that differs from the described installation 10 by having the tank 56a interposed in the conduit 12a so that the former forms parts of the water and steam legs 24a and 26a and the reference meeting level La of the water and steam is now within the conduit 12a. The present installation 10a with its tank 56a and water-flow control system 54a performs exactly like the described installation 10 with its tank 56 and water-flow control system 54, the practical difference between these installations being that in the present installation 10a the tank 56a becomes an integral, or at least fixed, part of the conduit 12a, while the separate provision of the tank 56 and water-flow control system 54 (Fig. 1) permits their ready application to existing vulcanizing apparatus of the continuous conduit type and also affords the possibility for their vertical adjustment to vary the reference level on making suitable provisions (not shown) for their adjustment.

In the present instance, the conduit 12a of substantially uniform width throughout is preferably extended at 130 through the tank 56a, and this conduit extension 130 is within the confines of the tank provided with a multiplicity of perforations 132 to provide for open communication between the tank and the conduit extension therethrough for maintaining the same reference meeting level La of the steam and water therein. In thus providing the perforated conduit extension 130 through the tank 56a, the old expediency of shooting the leading end of a new stock run through the conduit 12a may be resorted to, by opening the splice box 28 at the top end of the conduit, providing the leading stock end thereat with a rubber plug that serves as a temporary plunger, reclosing the splice box, and then admitting high-pressure steam to the conduit.

As already mentioned, the present installation 10a is in all respects like the installation 10, except that the tank 56a is interposed in the conduit 12a, and prominent parts of the instant installation are identified in Fig. 2 by the same reference numerals as their counterparts of the installation 10, save that the suffix "a" is added thereto.

Reference is now had to Fig. 3 which shows a vulcanizing installation 10b that may in all respects be like the installation 10 of Fig. 1, except that the conduit 12b is generally disposed horizontally, or substantially horizontally, having an intermediate slanting length 134 so that the water leg 24b may be below the steam leg 26b. The reference meeting level Lb in the tank 56b is, of course, kept within the vertical extent of the slanting length 134 of the conduit 12b. The present installation 10b with its conduit 12b, tank 56b and water-flow control system 54b, performs exactly like the installation 10 with its conduit 12, tank 56 and water-flow control system 54, and prominent parts of the present installation 10b are in Fig. 3 identified by the same reference numerals as their counterparts of the installation 10 in Fig. 1, except that the suffix "b" is added thereto.

Reference is now had to Fig. 4 which shows a vulcanizing installation 10d that differs from the previously described installations 10, 10a and 10b by having a different water-flow control system. The conduit and tank arrangement of the present installation 10d is the same as that of the installation 10, and prominent parts thereof are identified in Fig. 4 by the same reference numerals as their counterparts in the installation 10 of Fig. 1, except that the suffix "d" is added thereto.

The water-flow control system 140 of the present installation 10d comprises a discharge valve 142 and a steam generator 144. The discharge valve 142 comprises a casing 146 having a chamber 148 in which a valve element 150 is slidable into valve-opening and valve-closing positions, and inlet and outlet ports 152 and 154, respectively, in communication with the chamber 148, of which the inlet port 152 is also in communication with the conduit 50d. The stem 156 of the valve element 150, which projects into a cover 158 on top of the valve casing 146, is by a spring 160 normally urged in a direction, presently upwardly, to cause opening of the discharge valve 142.

The steam generator 144 of the water-flow control system 140 comprises a unit 162 having a longitudinal chamber 164, which at its opposite ends communicates with conduits 166 and 168, of which conduit 166 branches from the conduit 112d and conduit 168, which preferably extends through a cold-water storage leg 169, is at 170 in communication with a downwardly branching end 172 of the conduit 110d. Hence, with the chamber 164 of the presently inclined unit 162 extending intermediate its vertical extent on a level with the reference meeting level Ld of the steam and water in the tank 56d, water and steam from the tank 56d admitted into the chamber 164 meet therein on a level which at all times coincides with the reference level Ld in the tank. The lower end of the conduit 168 is presently connected to a valve 171 through which occasionally to drain the water from the chamber 164 and clean it by blowing high-pressure steam therethrough. The unit 162 of the steam generator 144 further comprises a preferably finned jacket or outer chamber 174 which is closed on both ends, and presently surrounds and is in heat-exchange relation with the inner chamber 164. For a purpose described hereinafter, the top end of the outer chamber 174 is accessible through a normally plugged opening 176, while the lower end of this outer chamber 174 is through a conduit 178 in communication with a diaphragm casing 180 which, in the present instance, is a bellows that is backed against the cover 158 on the valve casing 146 by the spring-urged stem 156 of the valve element 150 which tends to compress the bellows 180.

The outer chamber 174, conduit 178 and the bellows 180, which form a closed system in the steam generator 144, are completely filled with water through the normally plugged opening 176 at the top of the outer chamber 174. Hence, when the installation 10d is in operation and steam and water under pressure are present in the inner chamber 164 of the unit 162, the water in the outer chamber 174 of this unit 162 is flashed into steam by the heat from the adjacent steam in the inner chamber 164, with the result that the flashed steam in the outer chamber 174 displaces water into the bellows 180 and expands the same, against the spring force of the valve stem 156, so as to urge the valve element 150 in the discharge valve into its other, valve-closing position, and the meeting levels of the water and steam in the inner and outer chambers 164 and 174 of the unit 162 coincide with each other and with the reference meeting level Ld in the tank 56d, as will be readily understood.

The pressure in the closed system of the outer chamber 174, conduit 178 and bellows 180 may be, and preferably is, considerably lower than the pressures of the steam and water in the conduit 12d, tank 56d and the inner chamber 164 of the generator unit 162, and is a function of the force exerted by the valve spring 160 and the area of the belowsl 180.

In operation, and assuming that the exemplary reference level Ld is the proper and desired level, the instant water-flow control system 140 responds in its regulation of the discharge valve 142, as readily as the previously described water-flow control system 54 (Fig. 1), to even slight variations of the reference level Ld in the tank 56d, so that this reference level will remain substantially constant and the installation 10d will perform satisfactorily without requiring any supervision, or correction of the performance, of the present water-flow control system 140.

The present water-flow control system 140, consisting of the discharge valve 142 and the unit 162, is a standard product of the Bailey Meter Company of Cleveland, Ohio. Of course, as in the case of the previously described water-flow control system 54, the present water-flow control system 140 is applicable to vulcanizing apparatus of the continuous conduit type only because of the intervention of the tank 56d with its surgeless reference meeting level of the steam and water, and this control system would utterly fail if exposed to the more or less ceaseless surges of the water-steam meeting level in the customarily narrow conduit 12d in the absence of the tank 56d.

Of course, the present water-flow control system 140 could with equal advantage be used in vulcanizing installations in which the tank is interposed in the conduit as in Fig. 2, or in which the conduit is generally disposed horizontally, or substantially horizontally, as in Fig. 3.

Reference is now had to Fig. 5 which shows a vulcanizing installation 10e that differs from the previously described installation 10d by having the valve 142e of the water flow control system 140e interposed in the conduit 42e between the pump 38e and the inlet port 34e of the water leg 24e, wherefore this valve 142e is now a water admission valve. A conventional, manually regulatable water discharge valve 190 is connected with the conduit 50e. Hence, the water flow control system 140e exercises in this case control over the admission of water under pressure into the water leg 24e. To this end, the valve element 150e is inverted from its position shown in Fig. 4, so that the spring 160e normally urges this valve element into valve-closing position. With this arrangement, the water-admission valve 142e of the water flow control system 140e will function properly. Thus, when too much water is admitted into the water leg 24e, the reference level Le in the tank 56e will rise slightly, with the result that some of the steam in the outer chamber 174e of the steam generator 144e will immediately condensate, thereby somewhat relieving the water pressure in the bellows 180e and, hence, permitting the spring 160e to further close the valve element 150e so as to admit less water under pressure into the water leg 24e. Conversely, if insufficient water is admitted into the water leg 24e, the reference level Le in the tank 56e will, in consequence, drop slightly, with the result that additional water in the outer chamber 174e of the steam generator 144e will flash into steam and thus increase the water pressure in the bellows 180e for further slight opening of the valve element 150e and, accordingly, admission of slightly more water under pressure per time unit into the water leg 24e.

It will be appreciated from the foregoing that the water flow control system of the steam-generator type will perform equally satisfactorily regardless of whether the valve unit thereof is used for the admission of water under pressure into or for the discharge of water under pressure from the water leg of the installation. By the same token, it is fully within the purview of the present invention to arrange the valve unit of the water flow control system of any of the other described installations 10, 10a or 10b as a water admission valve, in which case the valve element thereof is merely inverted to function properly.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. Vulcanizing apparatus for continuous rubber-coated core stock, comprising a longitudinal conduit of substantially uniform cross-sectional area throughout and closed at its opposite ends except for the passage of stock therethrough with a sealing fit, different lengths of said conduit constituting steam and water legs, respectively, continuous with each other and having ports for admitting steam into, and circulating water substantially through, the respective steam and water legs, with the water leg being below the steam leg; a chamber in communication with said steam and water legs above and below the junction of said legs, respectively, said chamber being of greater cross-sectional area than said conduit and of such cross-sectional area and depth that a reference meeting level of water and steam therein is substantially surgeless under surge-inducing conditions in said conduit; and control means acting in response to small variation of said reference level in said chamber to regulate water circulation through said water leg 2. Vulcanizing apparatus as set forth in claim 1, in which said conduit is disposed substantially vertically.

3. Vulcanizing apparatus as set for the in claim 1, in which said conduit is disposed substantially horizontally and has a slanting length constituting adjacent end lengths of said legs, so that said water leg is below said steam leg.

4. Vulcanizing apparatus as set forth in claim 1, in which said chamber is formed around said conduit, and the latter extends at non-varying cross-sectional area through said chamber and is provided with perforations within the confines of said chamber.

5. Vulcanizing apparatus for continuous rubber-coated core stock, comprising a longitudinal conduit of substantially uniform cross-sectional area throughout and closed at its opposite ends except for the passage of stock therethrough with a sealing fit, different lengths of said conduit constituting steam and water legs, respectively, being continuous with each other and having an inlet in said steam leg and admission and discharge ports, in said water leg for admitting steam under pressure into said steam leg and for circulating water under pressure substantially through said water leg, with the water leg being below the steam leg and said admission and discharge ports being remote from and adjacent to said steam leg, respectively; a valve in communication with one of said ports; a chamber in communication with said steam and water legs above and below the junction of said legs, respectively, said chamber being of greater cross-sectional area than said conduit and of such cross-sectional area and depth that a reference meeting level of water and steam therein is substantially surgeless under surge-inducing conditions in said conduit; and a control device acting in response to small variation of said reference level in said chamber to regulate said valve.

References Cited in the file of this patent

UNITED STATES PATENTS

| | | |
|---|---|---|
| 1,851,422 | Durando | Mar. 29, 1932 |
| 2,540,497 | Stiegler | Feb. 6, 1951 |
| 2,737,973 | Kimmell | Mar. 13, 1956 |
| 2,789,314 | Davis | Apr. 23, 1957 |

FOREIGN PATENTS

| | | |
|---|---|---|
| 864,121 | France | Jan. 8, 1941 |

OTHER REFERENCES

"Van Nostrand's Scientific Encyclopedia," Pub. by D. Van Nostrand Co., Inc., 1947, pp. 1426. Copy in Div. 15.